Figure 1:
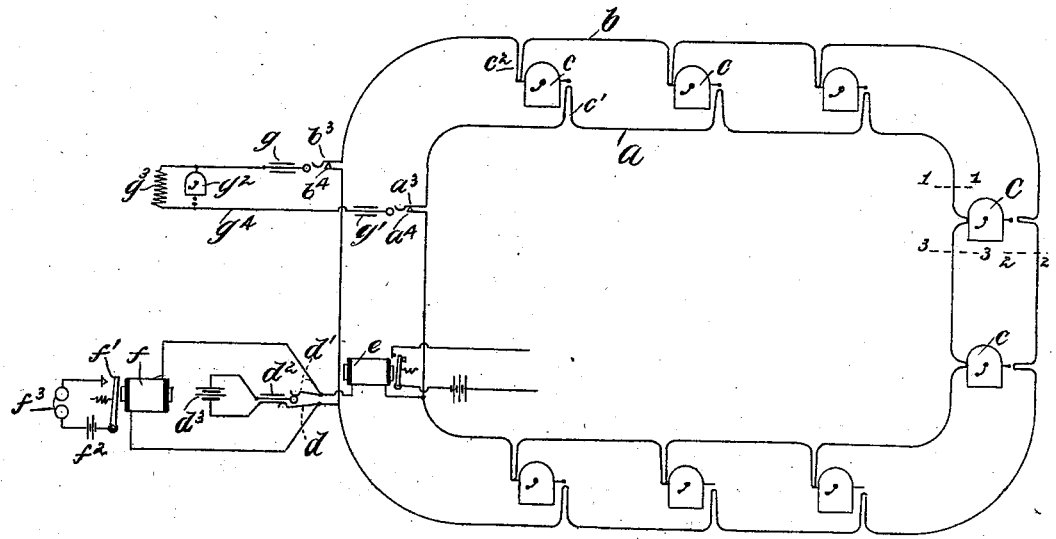

(No Model.)　　　　　　　M. E. BARRETT.　　　2 Sheets—Sheet 1.
DISTRICT ALARM SYSTEM.

No. 555,491.　　　　　　　　　　Patented Mar. 3, 1896.

Witnesses:
George L. Cragg.
W. Clyde Jones.

Inventor:
Max E. Barrett.
By Barton & Brown
Attorneys

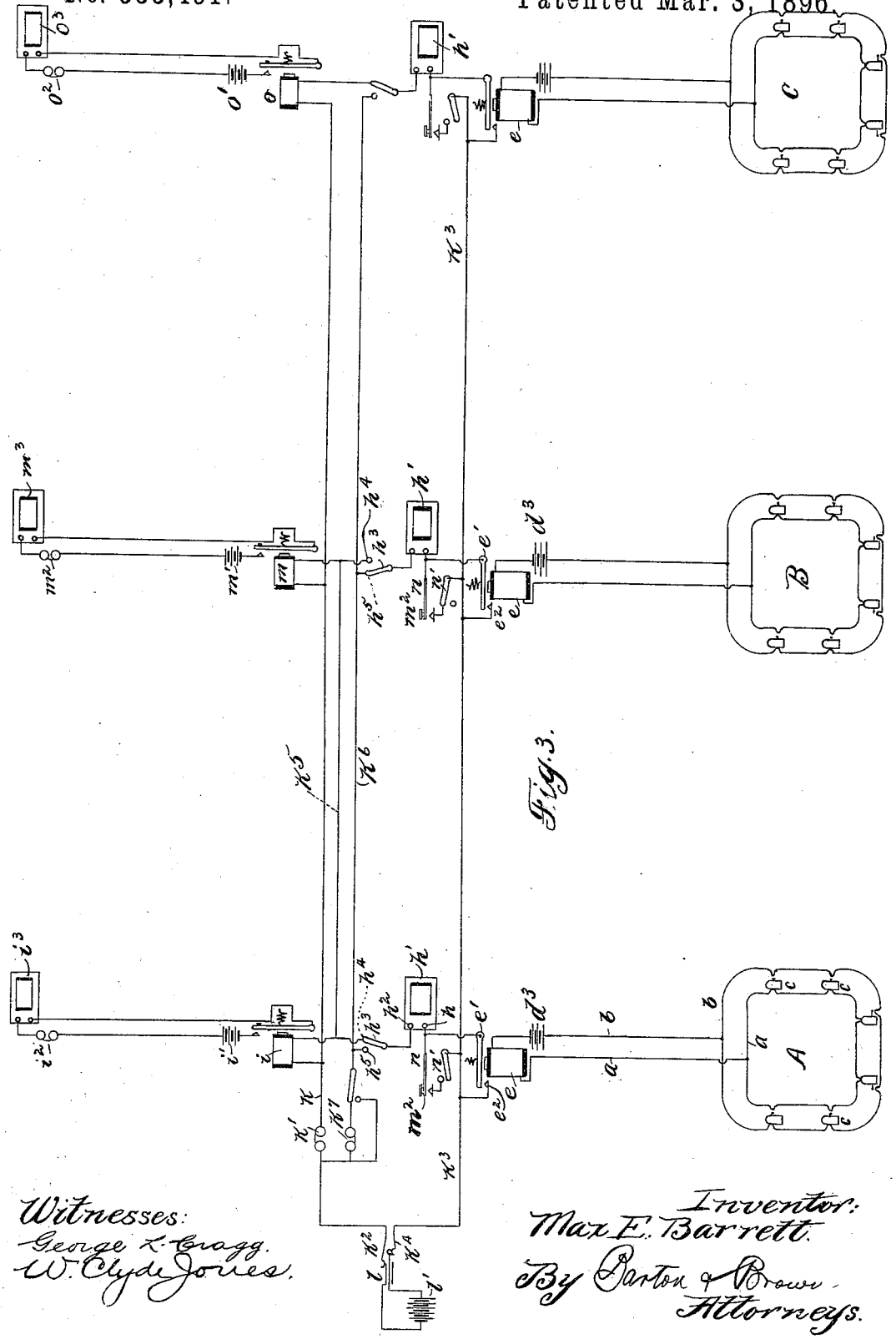

UNITED STATES PATENT OFFICE.

MAX E. BARRETT, OF CHICAGO, ILLINOIS, ASSIGNOR TO THE CHICAGO TELEPHONE COMPANY, OF SAME PLACE.

DISTRICT ALARM SYSTEM.

SPECIFICATION forming part of Letters Patent No. 555,491, dated March 3, 1896.

Application filed April 16, 1895. Serial No. 545,847. (No model.)

*To all whom it may concern:*

Be it known that I, MAX E. BARRETT, a citizen of the United States, residing at Chicago, in the county of Cook and State of Illinois, have invented a certain new and useful Improvement in District Alarm Systems, (Case No. 1,) of which the following is a full, clear, concise, and exact description, reference being had to the accompanying drawings, forming a part of this specification.

My invention relates to a district alarm system, and more particularly to a system for the transmission of fire-alarm signals from district boxes to one or more engine-houses, the object of my invention being to provide means for transmitting the signals with more certainty than has been possible heretofore and to provide an improved arrangement of circuits, and further to provide means for testing the circuits for faults.

Heretofore it has been the usual practice to arrange the several signal-boxes, distributed throughout the district to be protected, upon a single circuit in series, the circuit being normally closed about the signaling-instruments, which are automatically cut into circuit when a signal is sent over the lines. A difficulty encountered with this system arises from the fact that the opening of the circuit at any point by the breaking or cutting of the line completely blocks the transmission of signals until the line has been repaired.

In accordance with my invention the transmitting-instruments are arranged in circuit in such a manner that the opening of the circuit need not block the transmission of signals. I provide two conductors extending through the district to be protected, each conductor being closed upon itself, thus forming two round circuits. The signaling boxes or instruments are connected in multiple between the two round circuits, and a battery and responsive device at the central or signal-receiving station are connected in a bridge between the two round circuits. When circuit is closed through any signal-box, as in the act of sending a signal, two paths for the battery-current through the signal-box are provided, each of the round circuits affording two paths between the battery and the signaling-box.

If one of the round circuits be opened at any point the battery will find circuit through the other limb of the particular round circuit which is open. If both of the round circuits are opened, the battery-circuit will find a path over the unbroken limbs of the two circuits. In connection with each district circuit I provide a testing device, whereby an open circuit on the line may be detected. The several district circuits are connected with the central station and distant engine-houses in such a manner that a signal sent from a box upon one of the district circuits may produce a signal at two or more of the engine-houses simultaneously, or where desired a single district circuit may be connected up with but one of the engine-houses.

I will describe my invention more in particular with reference to the accompanying drawings, in which—

Figure 2:
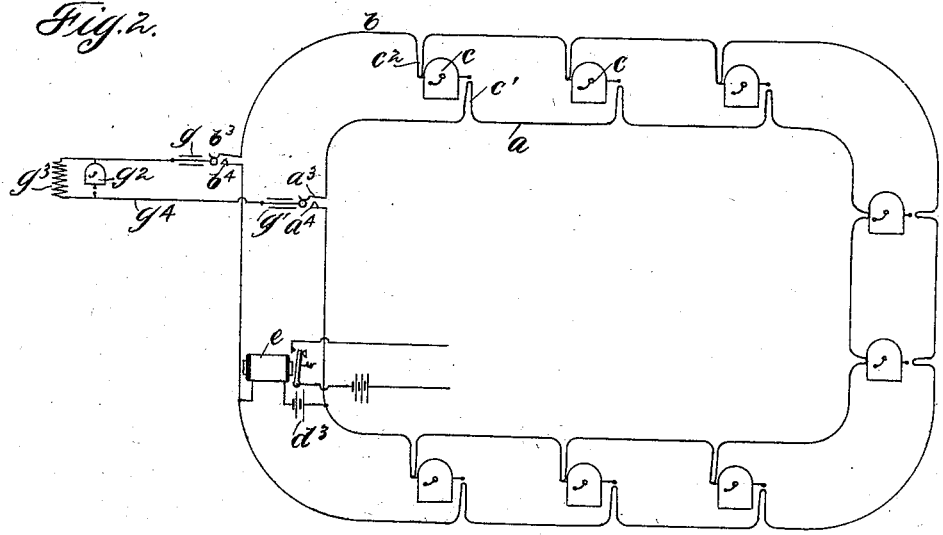

Figure 1 is a diagram illustrating the manner in which the signal-boxes are connected in circuit and the disposition of the central-station apparatus. Fig. 2 is a similar view showing the testing apparatus for testing the line. Fig. 3 is a diagram illustrating the district circuits connected with the central station and with distant engine-houses in accordance with my invention.

Like letters and numerals refer to like parts throughout the several figures.

Referring to Fig. 1, two lines or round circuits $a$ and $b$ are provided, which extend throughout the district to be protected. The line $a$ terminates at one end in the spring $a^3$ of a spring-jack and at the other end in a contact $a^4$, the spring and contact being normally closed together to form a completed round circuit. Likewise the line $b$ terminates at one end in a spring $b^3$ and at the other end in contact $b^4$, normally in engagement therewith. The several signal-boxes $c$ are connected in multiple between the lines $a$ and $b$. Each of the lines $a$ and $b$ is connected with the boxes by loops $c'$ $c^2$, the main line being thus brought to each box, so that an attempt to cut any particular box out of circuit will result in opening the main line.

At the central station a line-spring $d$ is connected with the circuit or line $b$, and a line-spring $d'$ is connected through the coil of the relay $e$ with the opposite circuit or line $a$. A plug $d^2$, between the terminals of which is connected a battery $d^3$, is inserted between the line-springs $d$ and $d'$, the battery $d^3$ and relay $e$ being thus included in a bridge between the two lines $a$ and $b$. If circuit be closed through any of the signal-boxes—as, for instance, the box C—the battery will find circuit through relay $e$, over line $a$ in two branches, through the box C and back to the battery over line $b$ in two branches. Should the line $a$ be broken at a point indicated by the dotted line 1 1, the box C would not be cut out of circuit, since the battery would find a path over the unbroken limb of line $a$. Should the circuit of line $b$ be broken at the same time at a point indicated by the dotted line 2 2, the box C would not be cut out of circuit, as the battery would find circuit over the unbroken limb of line $a$ and back over the unbroken limb of line $b$. Should, however, the same line be broken on opposite sides of the box, as indicated at 1 1 and 3 3, the box C would be cut out of circuit; but none of the other boxes would be cut out of circuit, and signals could be transmitted without interruption. Thus by the provision of two round circuits—that is, two lines closed on themselves, between which the signal-boxes are connected in multiple, and between which the battery and responsive device are connected—the liability of blocking the signals due to an open circuit is greatly diminished.

It often happens that the central-station battery $d^3$ gets out of order—as, for instance, when one of the battery-jars breaks—and in order to provide means for sounding an alarm when such an occurrence happens I provide a relay $f$ in a shunt-circuit about the battery $d^3$, the coil of the relay being of such resistance that but a slight current from the battery $d^3$ will pass therethrough, the current, however, being of sufficient strength to maintain the armature $f'$ attracted and open a local circuit containing a battery $f^2$ and bell $f^3$. Should the voltage of the battery fall below the normal or should the circuit become opened, as by the breaking of a battery-jar, the armature $f'$ will be released, thus closing the local circuit and sounding an alarm.

In Fig. 2 a plug $g$ is shown inserted in the spring-jack in line $b$, the spring $b^3$ making contact with the tip of the plug, while a plug $g'$ is inserted in the spring-jack of line $a$, the tip of the plug making contact with the spring $a^3$. The springs $a^3$ and $b^3$ are thus moved out of contact with their respective contacts $a^4$ and $b^4$. Between the plugs $g$ and $g'$ are connected a signal-box $g^2$ and a resistance-coil $g^3$. The round circuits $a$ are thus opened as the line-springs $a^3$ and $b^3$ are lifted out of contact with the contacts $a^4$ and $b^4$, respectively, and the test-circuit $g^4$ is connected between the lines at one end, while the battery $d^3$ and relay $e$ are connected between the lines at the other end. The resistance of the coil $g^3$ is adjusted relatively to the strength of battery $d^3$ and the winding of relay $e$, so that when the test-circuit is connected with the line sufficient current to actuate the relay flows from battery $d^3$ over line $a$, through resistance $g^3$, back by line $b$ and through the relay. If the circuit be open at any point the current from the battery cannot flow through the relay, thus giving evidence of the open circuit. The signal-box $g^2$ is provided, whereby a signal may be sent over the line to actuate relay $e$, thus testing the line to determine if it is in operative condition.

Referring to Fig. 3, the district circuit A comprises round circuits $a$ and $b$, between which the signal-boxes $c$ are connected in multiple, the central-station battery $d^3$ and relay $e$ being connected in a bridge between the two lines $a$ and $b$.

The armature-lever $e'$ of the relay is connected with the binding-post $h$ of a recording-receiver $h'$, the other binding-post, $h^2$, being connected with a switch-arm $h^3$ normally in contact with a terminal $h^4$, which is connected through the coil of a relay $i$ with a conductor $k$ extending through a bell $k'$ and terminating in a line-spring $k^2$. The back contact $e^2$ of the relay is connected by a conductor $k^3$ with a line-spring $k^4$. A plug $l$, between the terminals of which is connected the battery $l'$, is adapted to be inserted between the springs $k^2$ and $k^4$ to include the battery $l'$ in circuit.

When one of the call-boxes $c$ is operated the relay $e$ is actuated, thus attracting the armature $e'$ and successively closing the local relay-circuit, which may be traced from battery $l'$ through conductor $k^3$, contact $e^2$, relay-armature $e'$, receiver $h'$, switch $h^3$, relay $i$, conductor $k$, and bell $k'$ to the opposite side of the battery. The signal is thus recorded upon receiver $h'$, the bell $k'$ is rung, and the relay $i$ is actuated. The local circuit of relay $i$ contains a battery $i'$, and extends through a bell $i^2$ and registering-receiver $i^3$ at a distant engine-house. The district circuit B is connected through relay $e$ and battery $d^3$ in the same manner as the circuit A. Likewise the back contact $e^2$ of the relay is connected with the conductor $k^3$. The armature $e'$ is connected through a registering-receiver $h'$ and switch $h^3$, which normally rests on contact $h^4$ connected through relay $m$ to conductor $k$. The local circuit of relay $m$ contains, as in the former instance, a battery $m'$, bell $m^2$ and receiver $m^3$. The conductor extending between contact $h^4$ and relay $m$ is connected with the conductor extending between contact $h^4$ and relay $i$ of the apparatus on the left by a conductor $k^5$, the relays $m$ and $i$ being thus included in parallel, so that a signal sent over either circuit A or circuit B will ring the bells $i^2$ and $m^2$ and be recorded on the receivers $i^3$ and $m^3$, both engine-houses being thus signaled.

An inspector is continually making the rounds of the call-boxes to test them and determine whether they are in proper condition, and for this purpose he sends a signal to the central station. In order that this signal may not be transmitted to the engine-house the switch-arm $h^3$ is kept upon contact $h^5$ so long as the inspector is upon the particular circuit. In the apparatus belonging to circuit B the switch-arm is shown in this position, thus preventing the actuation of the relays $m$ and $i$ from circuit B. The contacts $h^5$ are connected with a conductor $k^6$ which extends through a bell $k^7$ to the conductor $k$.

A shunt-circuit $n$ is provided about the contact $e^2$ and armature $e'$ of the relay $e$ normally opened by switch $n'$. In this circuit is provided a key $m^2$. When the arm $h^3$ is in the position illustrated in connection with the apparatus of circuit B, a signal sent from any call-box will be registered upon the receiver $h'$, but will not be transmitted to the engine-houses, since the relays $m$ and $i$ are out of circuit. If a fire-signal should be turned in, the attendant will move the arm $h^3$ into contact with terminal $h^4$ and repeat the signal registered upon receiver $h'$ by means of the key $m^2$, the relays $i$ and $m$ being thus operated to convey the signals to the engine-houses. As soon as the fire-signal has been transmitted the switch-lever $h^3$ will be moved back to its former position, where it will be normally maintained until the inspector has completed the testing of circuit B.

Upon the right of Fig. 3 I have illustrated a third circuit C connected in a similar manner with a relay $e$ and receiver $h'$ at the central station and with a relay $o$, in the local circuit of which is provided a battery $o'$ and at a distant engine-house bell $o^2$ and receiver $o^3$.

Having thus described my invention, what I claim as new, and desire to secure by Letters Patent, is—

1. In a district alarm system, the combination with two metallic lines extending throughout the district to be protected, said lines being closed upon themselves to form two round circuits, of a battery and a responsive device in a bridge between said lines at the central station, a pair of contacts provided in each of said lines at the central station, and testing apparatus adapted to be connected to the ends of said lines when said contacts are separated to thus include the lines in circuit between the testing set at one end and the battery and responsive device at the other end; substantially as described.

2. In a district alarm system, the combination with two metallic lines extending throughout the district to be protected, said lines being closed upon themselves to form two round circuits, of a battery and a responsive device connected in a bridge between said lines at the central station, a pair of contacts provided in each of said lines, the adjusted resistance $g^3$, and signal-transmitter $g^2$ adapted to be connected with said lines when said contacts are separated; substantially as and for the purpose set forth.

3. In a district alarm system, the combination with a protective circuit situated in an outlying district, of a relay-magnet and a battery in circuit therewith and located at the central station; a local circuit including a battery, the contacts of said relay, a register, and the electromagnet of the second relay; a register at a distant station included in circuit with the contacts of said second relay; a switch at the central station for closing a shunt-circuit about the magnet of said second relay; and a repeating-key connected in parallel with the contacts of said first relay for repeating the signal recorded upon the register at the central station; substantially as described.

4. In a district alarm system, the combination with a plurality of protective circuits each connected with a relay-magnet at the central station, of a pair of limbs at the central station connected in circuit with a battery, a plurality of parallel branches between said limbs, the contacts of said relays being included in the respective parallel branches, a register, and the magnet of a second relay also included in each of said parallel branches, a conductor connecting two or more of said branches at points between the register and the magnet of the second relay and registers located at distant stations and connected one in circuit with the contacts of each of said second relays; substantially as described.

5. The combination with a pair of limbs connected in a circuit with a battery, of a plurality of parallel branches between said limbs, each of said parallel branches comprising the contacts of a relay, a register, and the magnet of a second relay, and a conductor connecting two or more of said branches at points between the register and the magnet of the second relay; substantially as described.

6. The combination with the conductors $k$ $k^3$ of the battery $l'$ connected in circuit therewith, a plurality of parallel branches between said conductors $k$ $k^3$ and each including the contacts of a relay, a register and the electromagnet of a second relay, the circuit controlled by said second relay extending to a distant engine-house and containing a register, district alarm-circuits connected in circuit with the relay-magnets belonging to said first-mentioned relay-contacts, and a conductor extending between two or more of said parallel branches and connected at points between the register and the electromagnet of the second relay; substantially as described.

In witness whereof I hereunto subscribe my name this 8th day of March, A. D. 1895.

MAX E. BARRETT.

Witnesses:
JOHN N. SINCLAIR,
W. CLYDE JONES.